United States Patent
Fiaschi et al.

(10) Patent No.: US 10,531,319 B2
(45) Date of Patent: Jan. 7, 2020

(54) INFORMATION EXCHANGE BETWEEN A MOBILE TRANSPORT NETWORK AND A CORE NETWORK

(71) Applicant: Telefonaktiebolaget LM Ericsson (publ), Stockholm (SE)

(72) Inventors: Giovanni Fiaschi, Stockholm (SE); Stefan Dahlfort, Stockholm (SE); Anton Smith, Stockholm (SE); Stephen Terrill, Madrid (ES)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 0 days.

(21) Appl. No.: 15/737,126

(22) PCT Filed: Jun. 15, 2015

(86) PCT No.: PCT/EP2015/063358
§ 371 (c)(1),
(2) Date: Dec. 15, 2017

(87) PCT Pub. No.: WO2016/202358
PCT Pub. Date: Dec. 22, 2016

(65) Prior Publication Data
US 2018/0184311 A1    Jun. 28, 2018

(51) Int. Cl.
*H04W 24/08* (2009.01)
*H04W 24/02* (2009.01)
(Continued)

(52) U.S. Cl.
CPC .......... *H04W 24/08* (2013.01); *H04W 24/02* (2013.01); *H04W 40/246* (2013.01); *H04W 92/045* (2013.01); *H04W 92/14* (2013.01)

(58) Field of Classification Search
CPC ... H04W 24/08; H04W 24/02; H04W 40/246; H04W 92/14
See application file for complete search history.

(56) References Cited

U.S. PATENT DOCUMENTS

| 7,626,932 B2 * | 12/2009 | Tuulos | H04L 41/0893 370/235 |
| 2013/0029708 A1 * | 1/2013 | Fox | H04W 28/08 455/509 |

(Continued)

OTHER PUBLICATIONS

3GPP, "3GPP TS 23.401 V13.2.0 (Mar. 2015)", 3rd Generation Partnership Project; Technical Specification Group Services and System Aspects; General Packet Radio Service (GPRS) enhancements for Evolved Universal Terrestrial Radio Access Network (E-UTRAN) access (Release 13), Mar. 2015, 1-313.

(Continued)

*Primary Examiner* — Wei Zhao
(74) *Attorney, Agent, or Firm* — Patent Portfolio Builders, PLLC

(57) ABSTRACT

A method (100) is disclosed, the method being performed in a network controller of a Mobile Transport Network. The Mobile Transport Network comprises communication links interconnecting network entities of a cellular Radio Access Network (RAN) and a core network. The method comprises receiving, from a network entity in the core network, an indication of traffic load within the RAN or between the RAN and the core network (102). Also disclosed is a method (200), performed in a network entity of a core network, the core network being connected to a cellular RAN by a Mobile Transport Network. The Mobile Transport Network comprises communication links interconnecting network entities of the core network and the RAN. The method (200) comprises sending to a network controller of the Mobile Transport Network an indication of traffic load within the RAN or between the RAN and the core network (202). Also disclosed are a network controller (300, 500), a core network entity (400, 600) and a computer program product configured to carry out methods in a network controller a core network entity.

39 Claims, 5 Drawing Sheets

(51) Int. Cl.
*H04W 40/24* (2009.01)
*H04W 92/04* (2009.01)
*H04W 92/14* (2009.01)

(56) References Cited

U.S. PATENT DOCUMENTS

| | | | |
|---|---|---|---|
| 2013/0170435 A1* | 7/2013 | Dinan | H04L 45/50 370/328 |
| 2013/0301415 A1 | 11/2013 | Archer et al. | |
| 2014/0233389 A1 | 8/2014 | Bantukul et al. | |
| 2014/0362688 A1 | 12/2014 | Zhang et al. | |
| 2016/0366607 A1* | 12/2016 | Zhang | H04W 28/0226 |

OTHER PUBLICATIONS

3GPP, "3GPP TS 29.274 V13.1.0 (Mar. 2015)", 3rd Generation Partnership Project; Technical Specification Group Core Network and Terminals; 3GPP Evolved Packet System (EPS); Evolved General Packet Radio Service (GPRS) Tunneling Protocol for Control plane (GTPv2-C); Stage 3, (Release 13), Mar. 2015, 1-317.
3GPP, "3rd Generation Partnership Project; Technical Specification Group Radio Access Network; Evolved Universal Terrestrial Radio Access Network (E-UTRAN); S1 Application Protocol (S1AP) (Release 12)", 3GPP TS 36.413 V12.5.0, Mar. 2015, 1-301.
Bojic, Dejan et al., "Advanced Wireless and Optical Technologies for Small-Cell Mobile Backhaul with Dynamic Software-Defined Management", IEEE Communications Magazine, Sep. 2013, 86-93.

* cited by examiner

INFORMATION EXCHANGE BETWEEN A MOBILE TRANSPORT NETWORK AND A CORE NETWORK

TECHNICAL FIELD

The present invention relates to methods performed in a network controller of a Mobile Transport Network and in a core network entity. The present invention also relates to a computer program product configured, when run on a computer, to carry out methods performed in a network controller of a Mobile Transport Network and in a core network entity.

BACKGROUND

The Third Generation Partnership Project (3GPP) standards specify the network architecture for third and fourth generation cellular communication networks, as well as the integration between 3G and 4G networks. The standards documents specify network entities and their roles, in particular concerning the interpretation of signalling from mobile User Equipment devices, enabling the allocation of appropriate bearer channels in the Radio Access Network (RAN) of a 3G or 4G network. Work is ongoing on the specification of fifth generation network entities and their roles.

The existing standards documents require the presence of a mobile backhaul, or Mobile Transport Network. The Mobile Transport Network provides communication links implementing an IP packet service that interconnects the different network entities. The 3GPP standards specify the Mobile Transport Network as a standard IPv4 or IPv6 network. However, Software Defined Networking (SDN) offers advantages over such traditional networks in terms of flexibility and network management, and is increasingly being favoured for Mobile Transport Networks. Implementation of SDN networking involves moving a part of the control plane functionality of the Mobile Transport Network towards standard, easy to program platforms.

In order to enable smooth running of a cellular network, the Mobile Transport Network must provide sufficient capacity to allocate all forecast traffic between network entities, and to avoid congestion conditions. This may require significant over-provisioning of transport capacity to handle periods of heavy network traffic. This over-provisioning leads to increased cost and complexity in the Mobile Transport Network.

SUMMARY

It is an aim of the present invention to provide a method and apparatus which obviate or reduce at least one or more of the disadvantages mentioned above.

According to a first aspect of the present invention, there is provided a method, performed in network controller of a Mobile Transport Network, the Mobile Transport Network comprising communication links interconnecting network entities of a cellular Radio Access Network, RAN, and a core network, the method comprising receiving, from a network entity in the core network, an indication of traffic load within the RAN or between the RAN and the core network. In some examples of the invention, the received indication of traffic load may be used by the network controller to facilitate resource allocation with the Mobile Transport Network.

According to examples of the invention, the network controller may carry out network control functions for the Mobile Transport Network. According to some examples, the network controller may be implemented as a distributed control plane. According to still further examples, the network controller may comprise a Software Defined Network (SDN) controller.

According to examples of the invention, receiving an indication of traffic load within the RAN or between the RAN and the core network may comprise receiving a message over a GPRS Tunnelling Protocol (GTP) based interface from the network entity in the core network. According to some examples, the message may be a GTPv2-C protocol message, as specified in TS 29.274. The message may for example be a Tunnel Management Message.

According to examples of the invention, the method may further comprise aggregating the received indication of traffic load with other received indications of traffic load within the RAN or between the RAN and the core network.

According to examples of the invention, aggregating may comprise aggregating the received indication of traffic load with other received indications of traffic load within the RAN or between the RAN and the core network over at least one interface within the RAN or between the RAN and the core network.

According to some examples of the invention, the action of aggregating the received indication of traffic load with other received indications of traffic load may enable the obtaining of a composite picture of traffic load, for example over a particular interface. The interface may be a RAN interface or core network interface, or may be between the RAN and the core network including for example S1, X2 or Iu interfaces. Aggregation may be particularly appropriate if GTPv2-C messages are used, as these messages are specified to indicate load per GTP tunnel, whereas traffic loads per RAN/core network interface may be of use to a network controller of a Mobile Transport Network, for example to facilitate resource management in an effort to ensure that all projected traffic over an interface can be handled.

According to examples of the invention, the indication of traffic load within the RAN or between the RAN and the core network may comprise at least one bearer channel request or release.

According to examples of the invention, the indication may further comprise at least one capacity requirement for the at least one bearer channel request or release. The capacity requirement may in some examples be a Service Level Agreement (SLA) stipulated capacity requirement including for example bandwidth, latency, jitter etc.

According to examples of the invention, the method may further comprise optimising resources within the Mobile Transport Network according to the received indication of traffic load within the RAN or between the RAN and the core network. Resource optimisation may in some examples include Unequal Cost Multipath, Traffic Engineering, Multilayer Routing etc. Performing such optimisation on the basis of the received traffic load information may in some examples enable a more efficient use of such techniques.

According to examples of the invention, the method may further comprise receiving topological information of the RAN. In some examples, topological information may include Network Entities or nodes in the RAN, Network Entities or nodes in the core network to which RAN nodes connect, and/or the interfaces over which the nodes connect. For example, in 4G networks, the topological information may include eNBs, MMEs, SGWs and the X2 and S1 interfaces via which they are interconnected.

According to examples of the invention, the topological information of the RAN may be received from an operations and management entity of the core network. For example if the core network is part of a 3G network, static RAN configuration information may be transferred to the network controller from an operations and management node.

According to examples of the invention, the topological information of the RAN may be received from the network entity in the core network. For example if the core network is part of a 4G network, dynamic RAN configuration information may be transferred from an MME of the 4G network.

According to examples of the invention, the topological information of the RAN may be received in an S1-AP message from the network entity in the core network. The S1-AP message may for example be an eNB/MME configuration transfer message as defined in TS 36.413.

According to examples of the invention, the method may further comprise sending, to the network entity in the core network, status information for the Mobile Transport Network.

According to examples of the invention, the status information may comprise congestion information, which may comprise Access Point Name congestion information.

In some examples, sending status information may comprise sending a message which may be a GTPv2-C message as specified in TS 29.274.

According to examples of the invention, the congestion information may comprise aggregated congestion information which is aggregated over at least one interface between the RAN and the core network.

In some examples, the aggregated congestion information may convey the usage status of particular S1, X2, and/or Iu interfaces on the basis of threshold settings. An interface list may be maintained by the network controller, on the basis of either static topological information received from an O&M node or dynamic information received from a core network entity.

According to examples of the invention, the network entity in the core network may comprise at least one of a Serving GPRS Support Node (SGSN) or a Mobility Management Entity (MME). In some alternative examples the network entity may comprise a Serving Gateway (SGW).

According to another aspect of the present invention, there is provided a method, performed in a network entity of a core network, the core network being connected to a cellular Radio Access Network, RAN, by a Mobile Transport Network, the Mobile Transport Network comprising communication links interconnecting network entities of the core network and the RAN, the method comprising sending, to a network controller of the Mobile Transport Network, an indication of traffic load within the RAN or between the RAN and the core network.

According to examples of the invention, the network controller may carry out network control functions for the Mobile Transport Network. According to some examples, the network controller may be implemented as a distributed control plane. According to still further examples, the network controller may comprise a Software Defined Network (SDN) controller.

According to examples of the invention, sending an indication of traffic load within the RAN or between the RAN and the core network may comprise sending a message to the network controller of the Mobile Transport Network over a GPRS Tunnelling Protocol (GTP) based interface. The message may be a GTPv2-C protocol message, as specified in TS 29.274.

According to examples of the invention, the indication of traffic load within the RAN or between the RAN and the core network may comprise at least one bearer channel request or release.

According to examples of the invention, the indication may further comprise at least one capacity requirement for the at least one bearer channel request or release. The capacity requirement may in some examples be a Service Level Agreement (SLA) stipulated capacity requirement including for example bandwidth, latency, jitter etc.

According to examples of the invention, the method may further comprise sending topological information of the RAN to the network controller of the Mobile Transport Network.

According to examples of the invention, sending topological information may comprise sending an S1-AP message to the network controller of the Mobile Transport Network, as specified in TS 36.413.

According to examples of the invention, the method may further comprise receiving status information for the Mobile Transport Network from the network controller of the Mobile Transport Network. The status information may comprise congestion information which may comprise Access Point Name congestion information.

According to examples of the invention, the congestion information may comprise aggregated congestion information which is aggregated over at least one interface between the radio access network and the core network.

According to examples of the invention, the method may further comprise optimising mobile service requests on the basis of the received status information. In some examples, optimising may comprise prioritising certain mobile service requests, or adjusting mobility and handover procedures to ensure continued quality of service. For example a UE within range of two cells may be instructed to connect to a more geographically distant cell, if the closer cell is connected to a particularly congested part of the Mobile Transport Network.

According to examples of the invention, the network entity may comprise at least one of a Serving GPRS Support Node (SGSN) or a Mobility Management Entity (MME).

According to another aspect of the present invention, there is provided a computer program configured, when run on a computer, to carry out a method according to the first or second aspects of the present invention.

According to another aspect of the present invention, there is provided a computer program product comprising computer readable material having stored thereon a computer program according to the preceding aspect of the present invention.

According to another aspect of the present invention, there is provided a network controller of a Mobile Transport Network, the Mobile Transport Network comprising communication links interconnecting network entities of a cellular Radio Access Network, RAN, and a core network, the network controller comprising a receiving unit for receiving, from a network entity in the core network, an indication of traffic load within the RAN or between the RAN and the core network.

According to examples of the invention, the network controller may carry out network control functions for the Mobile Transport Network. According to some examples, the network controller may be implemented as a distributed control plane. According to still further examples, the network controller may comprise a Software Defined Network (SDN) controller.

According to examples of the invention, the receiving unit may be for receiving a message over a GPRS Tunnelling Protocol (GTP) based interface from the network entity in the core network.

According to examples of the invention, the network controller may further comprise an aggregating unit for aggregating the received indication of traffic load with other received indications of traffic load within the RAN or between the RAN and the core network.

According to examples of the invention, the aggregating unit may be for aggregating the received indication of traffic load with other received indications of traffic load within the RAN or between the RAN and the core network over at least one interface between the RAN and the core network.

According to examples of the invention, the network controller may further comprise an optimising unit for optimising resources within the Mobile Transport Network according to the received indication of traffic load within the RAN or between the RAN and the core network.

According to examples of the invention, the network controller may further comprise a topology unit for receiving topological information of the RAN.

According to examples of the invention, the topology unit may be for receiving topological information of the RAN from an operations and management entity of the core network.

According to examples of the invention, the topology unit may be for receiving topological information of the RAN from the network entity in the core network.

According to examples of the invention, the topology unit may be for receiving topological information of the RAN in an S1-AP message from the network entity in the core network.

According to examples of the invention, the network controller may further comprise a transmitting unit for sending to the network entity in the core network status information for the Mobile Transport Network.

According to examples of the invention, the status information may comprise congestion information. In some examples, the congestion information may comprise aggregated congestion information over an interface and may comprise usage status of particular S1, X2, Iu interfaces on the basis of threshold settings. The network controller may further comprise an interface unit for maintaining an interface list on the basis of topological information which may be static information received from an operations and management node or may be dynamic information received from a core network entity.

According to another aspect of the present invention, there is provided a network entity of a core network, the core network being connected to a cellular Radio Access network (RAN) by a Mobile Transport Network, the Mobile Transport Network comprising communication links interconnecting network entities of the core network and the RAN, the network entity comprising a transmitting unit for sending, to a network controller of the Mobile Transport Network, an indication of traffic load within the RAN or between the RAN and the core network.

According to examples of the invention, the network controller may carry out network control functions for the Mobile Transport Network. According to some examples, the network controller may be implemented as a distributed control plane. According to still further examples, the network controller may comprise a Software Defined Network (SDN) controller.

According to examples of the invention, the transmitting unit may be for sending a message including the indication of traffic load within the RAN or between the RAN and the core network over a GPRS Tunnelling Protocol (GTP) based interface to the network controller of the Mobile Transport Network.

According to examples of the invention, the message may be a GTPv2-C protocol message.

According to examples of the invention, the network entity may further comprise a topology unit for sending topological information of the radio access network to the network controller of the Mobile Transport Network.

According to examples of the invention, the topology unit may be for sending an S1-AP message to the network controller of the Mobile Transport Network.

According to examples of the invention, the network entity may further comprise a status unit for receiving status information for the Mobile Transport Network from the network controller of the Mobile Transport Network.

According to examples of the invention, the status information may comprise congestion information.

According to examples of the invention, the network entity may further comprise an optimising unit for optimising mobile service requests on the basis of the received status information.

According to examples of the invention, the network entity may comprise at least one of a Serving GPRS Support Node (SGSN) or a Mobility Management Entity, MME.

According to another aspect of the present invention, there is provided a network controller of a Mobile Transport Network, the Mobile Transport Network comprising communication links interconnecting network entities of a cellular Radio Access Network (RAN) and a core network, the network controller comprising a processor and a memory, the memory containing instructions executable by the processor such that the network controller is operable to receive, from a network entity in the core network, an indication of traffic load within the RAN or between the RAN and the core network.

According to examples of the invention, the network controller may carry out network control functions for the Mobile Transport Network. According to some examples, the network controller may be implemented as a distributed control plane. According to still further examples, the network controller may comprise a Software Defined Network (SDN) controller.

According to another aspect of the present invention, there is provided a network entity of a core network, the core network being connected to a cellular Radio Access Network (RAN) by a Mobile Transport Network, the Mobile Transport Network comprising communication links interconnected network entities of the core network and the RAN, the network entity comprising a processor and a memory, the memory containing instructions executable by the processor such that the network entity is operable to send, to a network controller of the Mobile Transport Network, an indication of traffic load within the RAN or between the RAN and the core network.

According to examples of the invention, the network controller may carry out network control functions for the Mobile Transport Network. According to some examples, the network controller may be implemented as a distributed control plane. According to still further examples, the network controller may comprise a Software Defined Network (SDN) controller.

BRIEF DESCRIPTION OF THE DRAWINGS

For a better understanding of the present invention, and to show more clearly how it may be carried into effect, reference will now be made, by way of example, to the following drawings in which.

DETAILED DESCRIPTION

Figure 1:
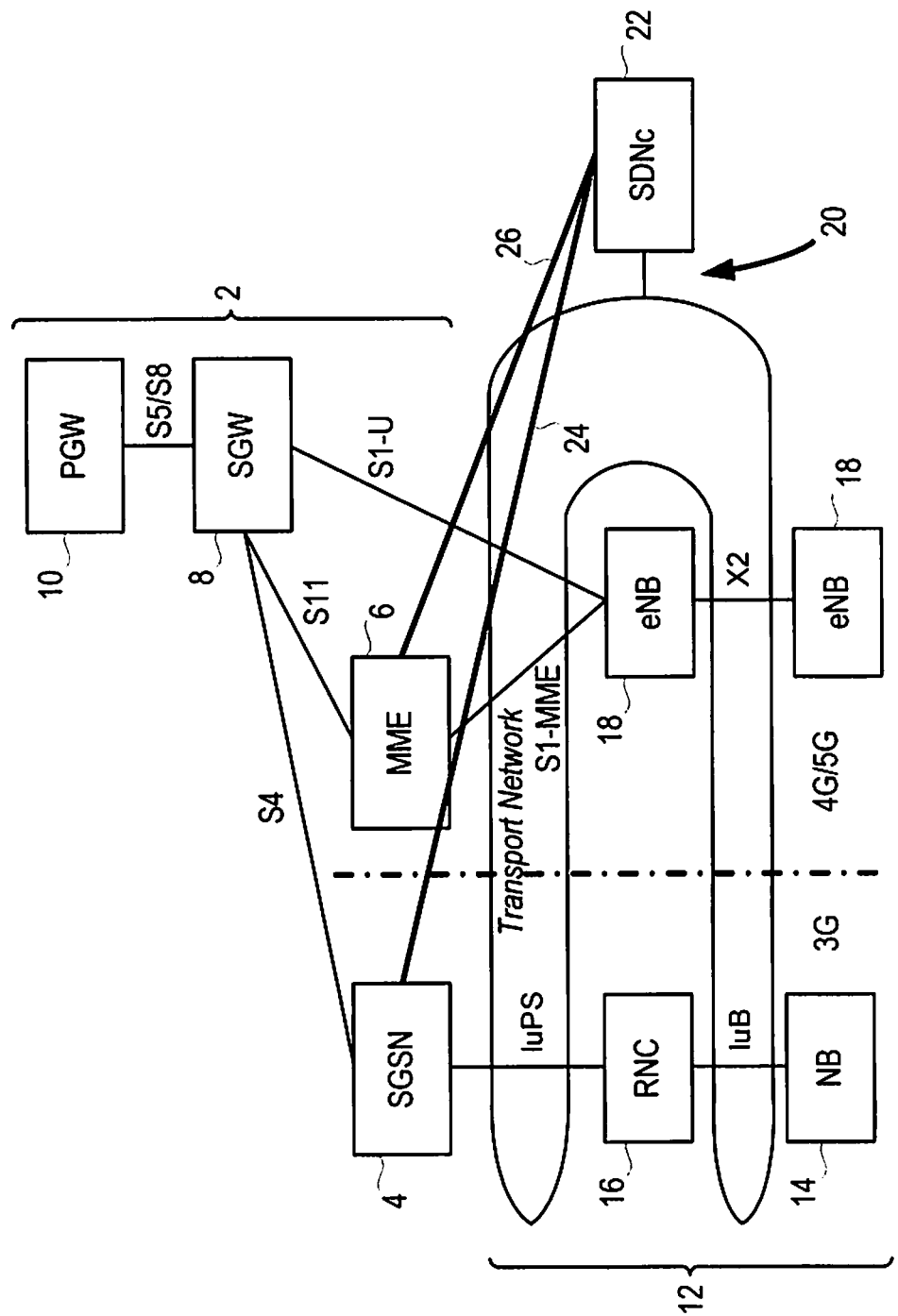
FIG. 1 illustrates network entities and interfaces according to example methods conducted in a core network entity and an SDN controller of a Mobile Transport Network.

Aspects of the present invention provide methods involving the transferring of information regarding traffic loading in or involving a RAN to a network controller of a Mobile Transport Network. This information transfer may take place over newly specified interfaces between appropriate core network entities and the network controller. The traffic information may enable the network controller to more efficiently manage resources within the Mobile Transport Network, thus reducing the need for over-provisioning the Mobile Transport Network while avoiding congestion conditions. The traffic load information may in some examples be accompanied by RAN topology information, particularly in the case of 4G and 5G networks, in which RAN topology may be dynamic, evolving with network requirements. In some examples, the network controller may be an SDN controller, and the mobile Transport Network may implement Software Defined Networking techniques.

The newly specified interfaces over which information may be transferred according to aspects of the present invention connect network entities in a core network, such as an Evolved Packet Core (EPC) with a network controller of a Mobile Transport Network, the Mobile Transport Network comprising the communication links which interconnect the network entities of the core network and a Radio Access Network (RAN). The traffic load information conveyed across the new interfaces may enable the network controller to more efficiently manage its resources, allocating traffic and freeing up resources as necessary to accommodate the traffic flowing within the RAN and between the RAN and the core network.

In some examples, the new interfaces may also be used to provide feedback from the network controller to the core network and via the core network to the RAN. This feedback may include congestion information for the Mobile Transport Network, and may thus enable the core network and RAN to prioritise certain mobile requests or to manage mobile traffic to avoid congested areas of the Mobile Transport Network.

The traffic load information conveyed to the network controller may in some examples be bearer channel requests and releases. Bearer channel requests and releases may also be accompanied by one or more capacity requirements for the bearer channel that is requested or released. The capacity requirements may for example be specified in a Service Level Agreement (SLA) and may comprise any one or more of bandwidth, latency, jitter etc.

The traffic load information may also be accompanied by topological information concerning the RAN. Topological information may be particularly useful in the case of 4G or 5G networks, in which RAN topology may dynamically evolve. The topological information for 4G and 5G networks may for example include eNodeBs, MMEs and SGWs as well as their interconnections by means of X2 and S1 interfaces. In the case of 3G networks, the RAN topology is simpler and static, involving NodeBs and one or more Radio Network Controllers (RNCs). This static topology information may be transferred to the network controller from an Operations and Management node. The transfer of static RAN topology information may only take place once, as the information does not change, unlike in the case of dynamic 4G and 5G networks, for which RAN topology information may accompany traffic load information for example with each transfer of traffic load information.

Existing communication protocols may be adapted to provide the traffic load information and RAN topology information to be transferred over the new interfaces. For example, the GTPv2-C protocol (3GPP TS 29.274) specifies Tunnel Management Messages that include bearer channel related information and are used for example on S4, S5, S8 and S11 interfaces. The S1-AP protocol (3GPP TS 36.413) specifies eNB/MME Configuration Transfer messages enabling the exchange of X2 topology information from an MME, where such information is maintained, to eNodeBs. These existing protocols may be updated to enable the transfer of bearer channel information and topology information over the newly defined interfaces between a core network element and a network controller of a Mobile Transport Network.

FIG. 1 is a schematic representation of a network architecture including the newly defined interfaces. The network architecture illustrated in FIG. 1 includes an example network controller in the form of an SDN controller. It will be appreciated that this is merely for the purposes of illustration. FIG. 1 illustrates elements of a core network 2 according to both 3G and 4G/5G network architecture. The 3G core network thus includes a Serving GPRS Support Node (SGSN) 4 and the 4G/5G core network includes a Mobility Management Entity (MME) 6, with both core networks including a Serving Gateway (SGW) 8 and a Packet Data Network Gateway (PGW) 10. FIG. 1 also illustrates elements of a RAN 12 according to both 3G and 4G/5G network architecture. The 3G RAN includes a NodeB 14 and an RNC 16. The 4G/5G RAN includes a plurality of eNodeBs 18. Interconnections within the RAN, over Iu and X2 interfaces, and between the RAN and the core network, over Iu and S1 interfaces, are provided by a Mobile Transport Network 20. The Mobile Transport Network comprises the communication links that connect individual elements of the RAN and core network with each other. In the illustrated network architecture of FIG. 1, the Mobile Transport Network is a Software Defined network, and includes a network controller in the form of an SDN controller 22.

FIG. 1 also illustrates two new interfaces over which traffic load information may be transferred to the SDN controller. A first new interface 24, for 3G RAN support, is illustrated between the SGSN 4 and the SDN controller 22. A second new interface 26, for 4G/5G RAN support, is illustrated between the MME 6 and the SDN controller 22. For both interfaces 24 and 26, the supporting communication protocol may include information related to bearer resource handling. This information is fully available in the Tunnel Management Messages of the GTPv2-C protocol discussed above. For the second new interface 26, the communication protocol may also include X2 topology information, the format of which may be derived from Configuration Transfer messages of the S1-AP protocol discussed above, notably the Configuration Transfer Information Element defined in section 9.2.3.26 of the S1-AP protocol standard. The GTPv2-C protocol may thus be reused to provide traffic load information over a core network-SDN controller interface, and in the case of Self Organising 4G/5G networks, may be enhanced with Configuration Transfer information from the S1-AP protocol.

The SDN controller may allocate aggregate connectivity to support the different interfaces for which it provides connectivity, including the X2 and S1 interfaces of 4G/5G networks and the Iu-B and Iu-PS interfaces of 3G networks. The information provided by the GTPv2-C protocol is however on a per GTP tunnel basis. It may therefore be that the SDN controller performs aggregation to convert GTP tunnel information into aggregated connectivity in support of S1, X2 and Iu interfaces. The aggregated traffic load information may then be used by the SDN controller to perform resource optimisation. The resource optimisation techniques used within a given Mobile Transport Network SDN controller may include for example Unequal Cost Multipath, traffic engineering, multilayer routing etc. Regardless of the exact technique used, the traffic load information provided according to examples of the present invention may enable the resource optimisation techniques to operate more efficiently.

In further examples of the invention, information may also be transferred across the newly defined interfaces in the opposite direction, from the network controller (the SDN controller in the example architecture of FIG. 1) to the core network entity (the SGSN or the MME). This information may include feedback on the status of the Mobile Transport Network, for example in the event of congestion in one or more areas of the Mobile Transport Network. The feedback may in some examples comprise Access Point Name (APN) congestion, which is already available in the GTPv2-C protocol. This feedback information may enable the core network entity, in combination with the RAN, to more efficiently manage mobile service requests in order to prioritise important requests and to avoid the most congested areas of the Mobile Transport network.

In some examples, the congestion feedback information may be aggregated over individual X2, S1 and/or Iu interfaces. The SDN controller may maintain an interface list and new messages may be introduced to the GTPv2-C protocol for communication between the SDN controller and core network entity, to enable communication of congestion information for individual interfaces, for example on the basis of threshold settings.

In some examples of the invention, the new interfaces 24 and 26 may be defined between an SGW and the network controller, as opposed to an MME/SGSN and the network controller. In such examples, eNodeB/X2 topology information, present in the S1-AP protocol, may be transferred from the MME to the SGW, as the SGW does not normally hold this information. Using the SGW may also result in a more complicated overall topology than is caused by using an MME, as there are generally fewer MMEs than SGWs in a core network. Nevertheless, the SGW remains an option for the new interfaces.

Figure 2:
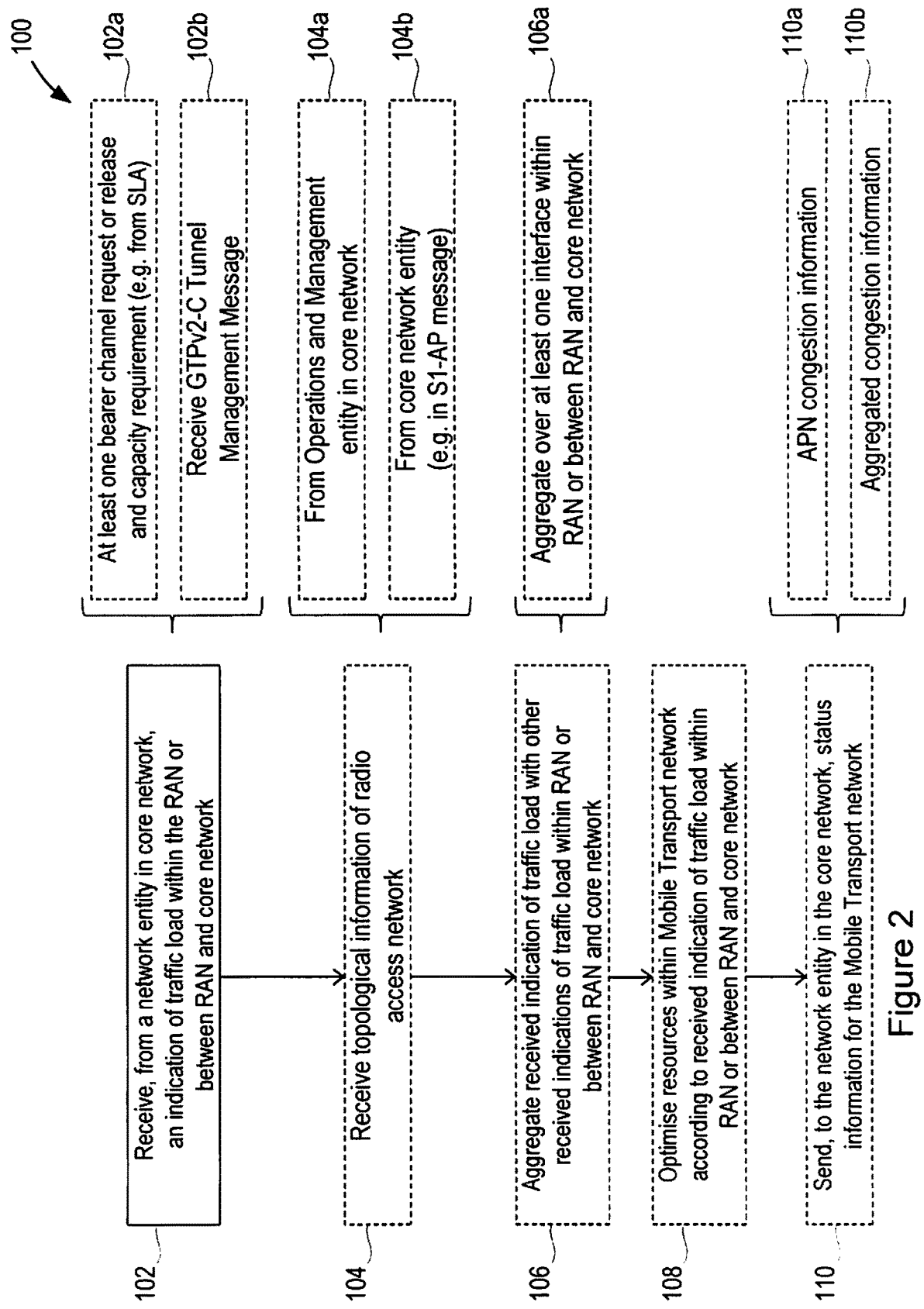
FIG. 2 is a flow diagram illustrating process steps in a method performed in a network controller of a Mobile Transport Network.
Figure 3:
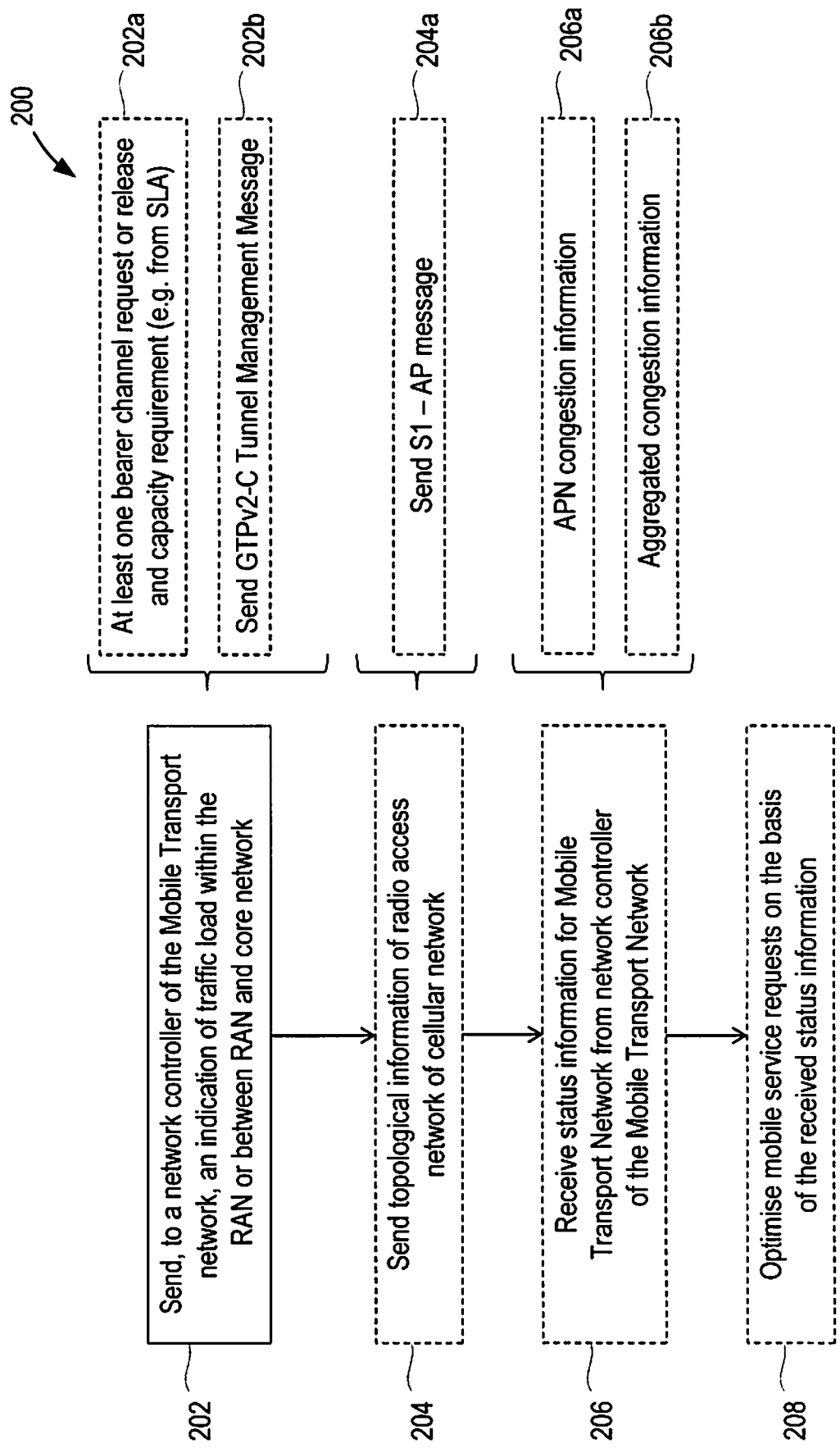
FIG. 3 is a flow diagram illustrating process steps in a method performed in a network entity of a core network.

FIGS. 2 and 3 illustrate examples of the methods of the present invention from the point of view of entities at either side of the newly proposed interfaces. FIG. 2 illustrates process steps in a first example method 100 conducted in a network controller of a Mobile Transport Network, the Mobile Transport Network comprising communication links that interconnect network entities of a cellular RAN and a core network. As in the case of FIG. 1 discussed above, a network controller in the form of an SDN controller is shown in FIG. 2 and discussed below for the purposes of illustration. However, it will be appreciated that other implementations of network controller may be envisaged. Referring to FIG. 2, in a first step 102, the SDN controller receives, from a network entity in the core network, an indication of traffic load within the RAN or between the RAN and the core network. The core network entity from which the traffic load indication is received may in some examples be an MME or an SGSN. Receiving the traffic load indication may comprise receiving, in step 102a, at least one bearer channel request or release, which may be accompanied by at least one capacity requirement for the at least one bearer channel request or release. As discussed above, the capacity requirement may be specified in an SLA, and may for example comprise bandwidth, latency, jitter, etc. The traffic load information may be received as a GTPv2-C Tunnel Management Message 102b.

The SDN controller may additionally receive topological information of the RAN in step 104. This topological information may include network nodes comprised within the RAN (NodeBs and RNCs or eNodeBs), network nodes in the core network to which the RAN nodes connect (SGSN, MME, SGW) and interfaces between the network nodes of the RAN and between the RAN nodes and the core network nodes to which they connect (Iu, X2 and S1 interfaces). The topological information may be received in step 104a from an Operations and Management node, for example if the topological information is static, as in the case of a 3G network architecture. Alternatively, in the case of 4G/5G network architectures, the topological information may be received in step 104b from the same core network entity as that from which the traffic load indication was received (for example the MME). The topological information may in such examples be received as an S1-AP message.

In step 106 of the method, the SDN controller may aggregate the received traffic load indication with other received indications of traffic load within the RAN or between the RAN and the core network. This may comprise, in step 106a, aggregating the received indication of traffic load with other received indications of traffic load over at least one interface within the RAN or between the RAN and the core network.

In step 108 of the method, the SDN controller may optimise resources within the Mobile Transport Network according to the indication of traffic load receive din step 102. As discussed above, the process of optimising resources may involve optimisation techniques including Unequal Cost Multipath, Traffic Engineering, Multilayer Routing etc. Performing such optimisation on the basis of the received traffic load information may enable a more efficient use of such techniques.

Finally, in step 110, the SDN controller may send to the core network entity (which may for example be an SGSN or an MME), status information for the Mobile Transport Network. The status information may be congestion information, and may be APN congestion information in step 110a, or may be aggregated congestion information in step 110b. The congestion information may be aggregated over a particular interface or interfaces on the basis of an interface list maintained in the SDN controller.

FIG. 3 illustrates process steps in a complementary example method 200 conducted in a network entity of a core network, the core network being connected to a cellular RAN by a Mobile Transport Network, the Mobile Transport Network comprising communication links interconnecting network entities of the core network and the RAN. The core network entity may for example be an MME or an SGSN. Referring to FIG. 2, in a first step 202, the core network entity sends to a network controller of the Mobile Transport Network an indication of traffic load within the RAN or between the RAN and the core network. This may comprise sending, in step 202a, at least one bearer channel request or release, which may be accompanied by at least one capacity requirement for the at least one bearer channel request or release. As discussed above, the capacity requirement may be specified in an SLA, and may for example comprise bandwidth, latency, jitter, etc. The traffic load information may be sent as a GTPv2-C Tunnel Management Message 202b. As in the case of FIGS. 1 and 2 discussed above, a network controller in the form of an SDN controller is shown in FIG. 3 and discussed below for the purposes of illustration. However, it will be appreciated that other implementations of network controller may be envisaged.

The core network entity may additionally send topological information of the RAN in step 204. This topological information may include network nodes comprised within the RAN (Nodes and RNCs or eNodeBs), network nodes in the core network to which the RAN nodes connect (SGSN, MME, SGW) and interfaces between the network nodes of the RAN and between the RAN nodes and the core network nodes to which they connect (Iu, X2 and S1 interfaces). The core network entity may send the topological information as an S1-AP message in step 204a.

In step 206, the core network entity may receive from the SDN controller status information for the Mobile Transport Network. The status information may be congestion information, and may be APN congestion information received in step 206a, or may be aggregated congestion information received in step 206b. The congestion information may be aggregated over a particular interface or interfaces on the basis of an interface list maintained in the SDN controller. In step 208, the core network entity may optimise mobile service requests on the basis of the received status information. This may comprise prioritising certain mobile service requests, or adjusting mobility and handover procedures to ensure continued quality of service. For example a UE within range of two cells may be instructed to connect to a more geographically distant cell, if the closer cell is connected to a particularly congested part of the Mobile Transport Network.

Together the above discussed methods 100, 200 thus implement the functionality discussed above with reference to FIG. 1, transferring information about traffic load within the RAN or between the RAN and the core network to an SDN controller, thus enabling the SDN controller to more efficiently optimise Mobile Transport Network resources. The information transfer is conducted over newly defined interfaces between a core network entity and the SDN controller.

Figure 4:
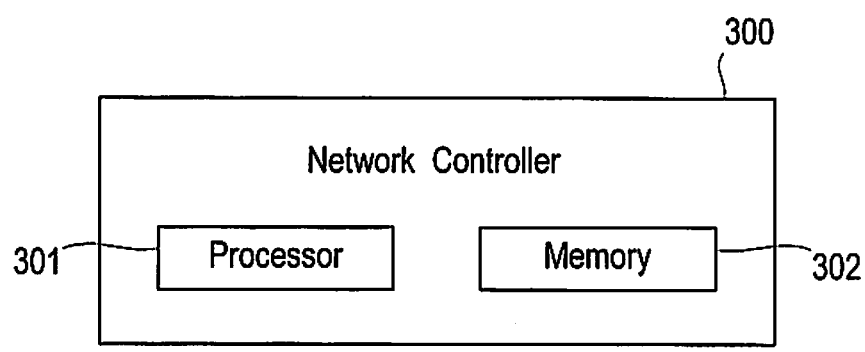
FIG. 4 is a block diagram illustrating functional units in a network controller.

As discussed above, the methods 100 and 200 may be implemented by a core network entity, such as an MME or an SGSN, and by a network controller of a Mobile Transport Network. FIG. 4 illustrates an example network controller 300 which may implement the method 100 for example on receipt of suitable instructions from a computer program. Referring to FIG. 4, the controller 300 comprises a processor 301 and a memory 302. The memory 302 contains instructions executable by the processor 301 such that the controller 300 is operative to conduct some or all of the steps of the method 100. The network controller may for example be an SDN controller.

Figure 5:
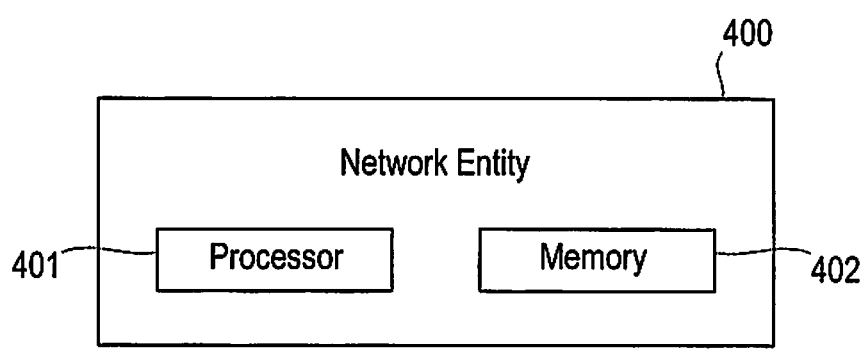
FIG. 5 is a block diagram illustrating functional units in a network entity.

FIG. 5 illustrates an example core network entity 400 which may implement the method 200 for example on receipt of suitable instructions from a computer program. Referring to FIG. 5, the core network entity 400 comprises a processor 401 and a memory 402. The memory 402 contains instructions executable by the processor 401 such that the core network entity 400 is operative to conduct some or all of the steps of the method 200.

Figure 6:
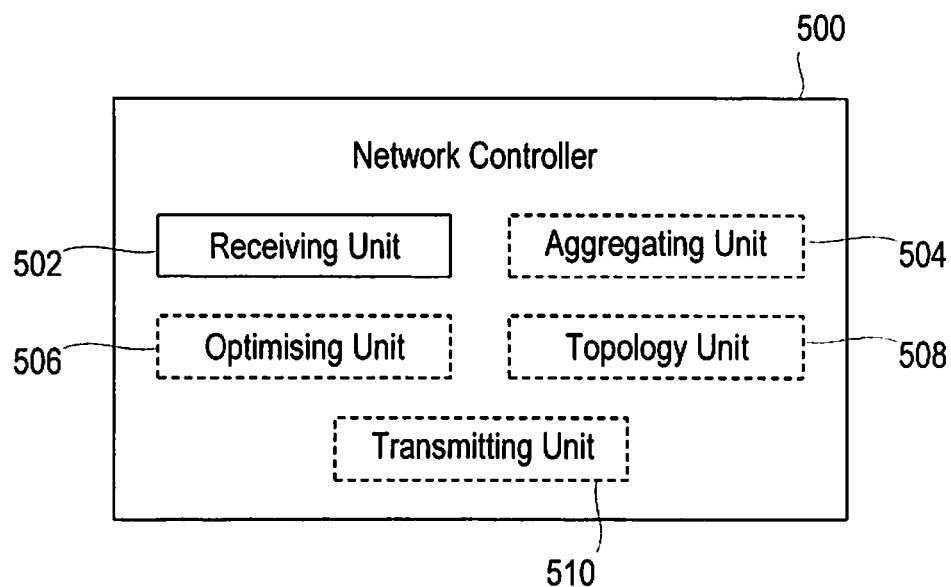
FIG. 6 is a block diagram illustrating functional units in another example of network controller.

FIG. 6 illustrates an alternative example of network controller 500, which may implement the method 100, for example on receipt of suitable instructions from a computer program. The network controller is thus a network controller for a Mobile Transport Network, which Mobile Transport Network comprises communication links interconnecting network entities of a core network and a cellular RAN. It will be appreciated that the units illustrated in FIG. 6 may be realised in any appropriate combination of hardware and/or software. For example, the units may comprise one or more processors and one or more memories containing instructions executable by the one or more processors. The units may be integrated to any degree. Referring to FIG. 6, the network controller 500 comprises a receiving unit 502 for receiving, from a network entity in the core network, an indication of traffic load within the RAN or between the RAN and the core network. The receiving unit may be for receiving a message over a GPRS Tunnelling Protocol (GTP) based interface from the network entity in the core network.

The network controller 500 may further comprise an aggregating unit 504 for aggregating the received indication of traffic load with other received indications of traffic load within the RAN or between the RAN and the core network. The aggregating unit 504 may be for aggregating the received indication of traffic load with other received indications of traffic load over at least one interface between the RAN and the core network.

The network controller 500 may further comprise an optimising unit 506 for optimising resources within the Mobile Transport Network according to the received indication of traffic load within the RAN or between the RAN and the core network.

The network controller 500 may further comprise a topology unit 508 for receiving topological information of the RAN. The topology unit 508 may be for receiving topological information of the RAN from an operations and management entity of the core network or from the network entity in the core network. The topology unit 508 may be for receiving topological information of the RAN in an S1-AP message from the network entity in the core network.

The network controller 500 may further comprise a transmitting unit 510 for sending to the network entity in the core network status information for the Mobile Transport Network. The status information may comprise congestion information and in some examples the congestion information may comprise aggregated congestion information over an interface and may comprise usage status of particular S1, X2, Iu interfaces on the basis of threshold settings. The network controller may further comprise an interface unit for maintaining an interface list on the basis of topological information which may be static information received from an operations and management node or may be dynamic information received from a core network entity.

The network controller may in some examples be an SDN controller.

Figure 7:
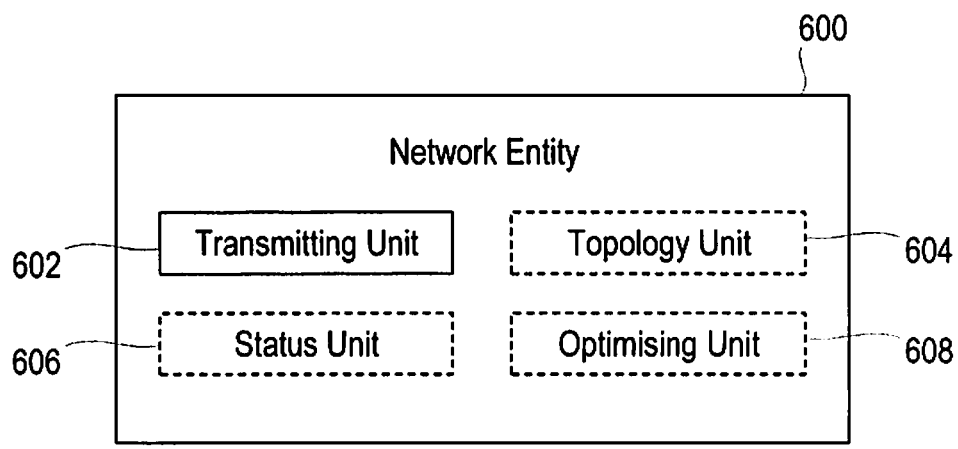
FIG. 7 is a block diagram illustrating functional units in another example of network entity.

FIG. 7 illustrates an alternative example of core network entity 600, which may implement the method 200, for example on receipt of suitable instructions from a computer program. The core network entity may for example be an MME or an SGSN. The core network may be connected to a RAN by a Mobile Transport Network, which Mobile Transport Network comprises communication links interconnecting network entities of the core network and the RAN. It will be appreciated that the units illustrated in FIG. 7 may be realised in any appropriate combination of hardware and/or software. For example, the units may comprise one or more processors and one or more memories containing instructions executable by the one or more processors. The units may be integrated to any degree. Referring to FIG. 7, the core network entity 600 comprises a transmitting unit 602 for sending to a network controller of the Mobile Transport Network an indication of traffic load within the RAN or between the RAN and the core network. The transmitting unit 602 may be for sending a message including the indication of traffic load within the RAN or between the RAN and the core network over a GPRS Tunnelling Protocol (GTP) based interface to the network controller of the Mobile Transport Network. The message may be a GTPv2-C protocol message.

The core network entity 600 may further comprise a topology unit 604 for sending topological information of the radio access network to the network controller of the Mobile Transport Network. The topology unit 604 may be for sending an S1-AP message to the network controller of the Mobile Transport Network.

The core network entity 600 may further comprise a status unit 606 for receiving status information for the Mobile Transport Network from the network controller of the Mobile Transport Network. The status information may comprise congestion information.

The core network entity may further comprise an optimising unit 608 for optimising mobile service requests on the basis of the received status information.

Aspects of the present invention thus provide methods that enable cooperation between a core network entity and a network controller of a Mobile Transport Network. Traffic load information is conveyed over a newly defined interface from a core network entity to a network controller, enabling the network controller to take account of this information in efficiently managing the Mobile Transport Network resources to handle the coming traffic. Feedback may also be provided from the network controller concerning the congestion status of the Mobile Transport Network, enabling the core network and RAN to efficiently manage mobile service requests.

Aspects of the invention may thus enable a network controller to more efficiently manage the resources of the mobile Transport Network, so reducing capital expenditure by reducing the need for over-provisioning and/or providing improved congestion avoidance. In addition, with feedback from the network controller concerning congestion status of the Mobile Transport Network, the core network and RAN may better optimize mobile service provision, for example rejecting calls that would receive insufficient quality of service, prioritising certain service requests and managing handover and mobility procedures to avoid areas of congestion in the Mobile Transport Network.

The methods of the present invention may be implemented in hardware, or as software modules running on one or more processors. The methods may also be carried out according to the instructions of a computer program, and the present invention also provides a computer readable medium having stored thereon a program for carrying out any of the methods described herein. A computer program embodying the invention may be stored on a computer readable medium, or it could, for example, be in the form of a signal such as a downloadable data signal provided from an Internet website, or it could be in any other form.

It should be noted that the above-mentioned examples illustrate rather than limit the invention, and that those skilled in the art will be able to design many alternative embodiments without departing from the scope of the appended claims. The word "comprising" does not exclude the presence of elements or steps other than those listed in a claim, "a" or "an" does not exclude a plurality, and a single processor or other unit may fulfil the functions of several units recited in the claims. Any reference signs in the claims shall not be construed so as to limit their scope.

The invention claimed is:

1. A method performed in a network controller of a Mobile Transport Network, the Mobile Transport Network comprising communication links interconnecting network entities of a cellular Radio Access Network (RAN) and a core network, the method comprising:
   receiving, from a network node in the core network, an indication of traffic load within the RAN or between the RAN and the core network, wherein receiving the indication of traffic load comprises receiving a message over a GPRS Tunnelling Protocol (GTP) based interface from the network node in the core network, and wherein the message is a GTPv2-C protocol message; and
   optimising resources within the Mobile Transport Network according to the received indication of traffic load within the RAN or between the RAN and the core network.

2. The method as claimed in claim 1, further comprising aggregating the received indication of traffic load with other received indications of traffic load within the RAN or between the RAN and the core network.

3. The method as claimed in claim 2, wherein aggregating comprises aggregating the received indication of traffic load with the other received indications of traffic load over at least one interface within the RAN or between the RAN and the core network.

4. The method as claimed in claim 1, wherein the received indication of traffic load within the RAN or between the RAN and the core network comprises at least one bearer channel request or release.

5. The method as claimed in claim 4, wherein the received indication further comprises at least one capacity requirement for the at least one bearer channel request or release.

6. The method as claimed in claim 1, further comprising receiving topological information of the RAN.

7. The method as claimed in claim 6, wherein the topological information is received from an operations and management node of the core network.

8. The method as claimed in claim 6, wherein the topological information is received from at least one core network node.

9. The method as claimed in claim 8, wherein the topological information is received in an S1-AP message.

10. The method as claimed in claim 1, further comprising sending, to the network node in the core network, status information for the Mobile Transport Network.

11. The method as claimed in claim 10, wherein the status information comprises congestion information.

12. The method as claimed in claim 11, wherein the congestion information comprises Access Point Name congestion information.

13. The method as claimed in claim 11, wherein the congestion information comprises aggregated congestion information that is aggregated over at least one interface between the RAN and the core network.

14. The method as claimed in claim 1, wherein the network node in the core network is at least one of a Serving GPRS Support Node (SGSN) or a Mobility Management Entity (MME).

15. A method performed in a network node of a core network coupled to a Radio Access Network (RAN) and a Mobile Transport Network, the Mobile Transport Network comprising communication links interconnecting network entities of the core network and the RAN, the method comprising:
sending, to a network controller of the Mobile Transport Network, an indication of traffic load within the RAN or between the RAN and the core network, wherein sending the indication of traffic load comprises sending a message to the network controller of the Mobile Transport Network over a GPRS Tunnelling Protocol (GTP) based interface, and wherein the message is a GTPv2-C protocol message;
after sending the indication of traffic load, receiving status information, for the Mobile Transport Network, from the network controller of the Mobile Transport Network; and
optimising mobile service requests based on the received status information.

16. The method as claimed in claim 15, wherein the indication of traffic load within the RAN or between the RAN and the core network comprises at least one bearer channel request or release.

17. The method as claimed in claim 16, wherein the indication further comprises at least one capacity requirement for the at least one bearer channel request or release.

18. The method as claimed in claim 15, further comprising sending topological information of the RAN to the network controller of the Mobile Transport Network.

19. The method as claimed in claim 18, wherein the topological information is sent by the network node in an S1-AP message.

20. The method as claimed in claim 15, wherein the received status information comprises congestion information.

21. The method as claimed in claim 20, wherein the congestion information comprises Access Point Name congestion information.

22. The method as claimed in claim 20, wherein the congestion information comprises aggregated congestion information that is aggregated over at least one interface between the RAN and the core network.

23. The method as claimed in claim 15, wherein the network node comprises at least one of a Serving GPRS Support Node (SGSN) or a Mobility Management Entity (MME).

24. A non-transitory computer-readable medium storing computer-executable instructions that, when executed by at least one processor, configure the network controller to perform operations corresponding to the method of claim 1.

25. A non-transitory computer-readable medium storing computer-executable instructions that, when executed by at least one processor, configure the network node to perform operations corresponding to the method of claim 15.

26. A network controller of a Mobile Transport Network, the Mobile Transport Network comprising communication links interconnecting network entities of a cellular Radio Access Network (RAN) and a core network, the network controller comprising:
one or more processors; and
one or more memories comprising instructions that, when executed by the one or more processors, configure the one or more processors to:
receive, from a network node in the core network, an indication of traffic load within the RAN or between the RAN and the core network, wherein to receive the indication of traffic load, the instructions configure the one or more processors to receive a message over a GPRS Tunnelling Protocol (GTP) based interface from the network node in the core network, and wherein the message is a GTPv2-C protocol message; and
optimise resources within the Mobile Transport Network according to the received indication of traffic load within the RAN or between the RAN and the core network.

27. The network controller as claimed in claim 26, wherein the instructions further configure the one or more processors to aggregate the received indication of traffic load with other received indications of traffic load within the RAN or between the RAN and the core network.

28. The network controller as claimed in claim 27, wherein the instructions configure the one or more processors to aggregate the received indication of traffic load with the other received indications of traffic load within the RAN or between the RAN and the core network over at least one interface between the RAN and the core network.

29. The network controller as claimed in claim 26, wherein the instructions further configure the one or more processors to receive topological information of the RAN.

30. The network controller as claimed in claim 29, wherein the topological information is received from an operations and management node of the core network.

31. The network controller as claimed in claim 29, wherein the topological information is received from at least one core network node.

32. The network controller as claimed in claim 31, wherein the topological information is received in an S1-AP message.

33. The network controller as claimed in claim 26, wherein the instructions further configure the one or more processors to send, to the network node in the core network, status information for the Mobile Transport Network.

34. The network controller as claimed in claim 33, wherein the status information comprises congestion information.

35. A network node of a core network, the core network being connected to a cellular Radio Access network (RAN) by a Mobile Transport Network, the Mobile Transport Network comprising communication links interconnecting network entities of the core network and the RAN, the network node comprising:
one or more processors; and
one or more memories comprising instructions that, when executed by the one or more processors, configure the one or more processors to:

send, to a network controller of the Mobile Transport Network, an indication of traffic load within the RAN or between the RAN and the core network, wherein to send the indication of traffic load, the instructions configure the one or more processors to send a message over a GPRS Tunnelling Protocol (GTP) based interface to the network controller of the Mobile Transport Network, and wherein the message is a GTPv2-C protocol message;

after the indication of traffic load is sent, receive status information, for the Mobile Transport Network, from the network controller of the Mobile Transport Network; and optimise mobile service requests based on the received status information.

36. The network node as claimed in claim 35, wherein the instructions further configure the one or more processors to send topological information of the RAN to the network controller of the Mobile Transport Network.

37. The network node as claimed in claim 36, wherein the topological information is sent in an S1-AP message.

38. The network node as claimed in claim 35, wherein the received status information comprises congestion information.

39. The network node as claimed in claim 35, wherein the network node comprises at least one of a Serving GPRS Support Node (SGSN) or a Mobility Management Entity (MME).

* * * * *